United States Patent [19]

Ohsawa et al.

[11] Patent Number: 5,099,356
[45] Date of Patent: Mar. 24, 1992

[54] ELECTROCHROMIC DEVICE WITH AN ELECTROLYTE COMPRISING A LITHIUM SALT AND A SODIUM SALT

[75] Inventors: Yasuhiko Ohsawa, Tokyo; Katsunori Aoki, Yokosuka; Takeshi Miyamoto, Yokohama; Masazumi Ishikawa, Uji; Hiroshi Inaba, Matsusaka; Kiyoshi Nakase, Mie, all of Japan

[73] Assignees: Central Glass Company, Limited, Ube; Nissan Motor Co., Ltd., Yokohama, both of Japan

[21] Appl. No.: 501,922

[22] Filed: Mar. 28, 1990

[30] Foreign Application Priority Data

Mar. 31, 1989 [JP] Japan .................. 1-80536

[51] Int. Cl.$^5$ .............................................. G02F 1/153
[52] U.S. Cl. ...................................... 359/270; 359/272
[58] Field of Search .................. 350/357; 359/270, 272

[56] References Cited

U.S. PATENT DOCUMENTS

| 4,726,664 | 2/1988 | Tada et al. | 350/357 |
| 4,750,816 | 6/1988 | Ito et al. | 350/357 |
| 4,801,195 | 1/1989 | Kawai et al. | 350/357 |
| 4,958,917 | 9/1990 | Hashimoto et al. | 350/357 |

FOREIGN PATENT DOCUMENTS

| 3438492 | 5/1985 | Fed. Rep. of Germany . | |
| 58-215630 | 12/1983 | Japan | 350/357 |
| 216225 | 12/1983 | Japan | 350/357 |

OTHER PUBLICATIONS

Japanese Abstract 60-257429 A.

Primary Examiner—Rolf Hille
Assistant Examiner—Robert P. Limanek
Attorney, Agent, or Firm—Fleit, Jacobson, Cohn, Price, Holman & Stern

[57] ABSTRACT

The invention relates to an electrochromic (EC) device having oppositely arranged two EC electrode layers. The first EC electrode layer uses Prussian blue, osmium purple or ruthenium purple and accordingly takes on a characteristic color by electrochemical oxidation, and the second EC electrode layer uses a transition metal oxide which takes on a characteristic color by electrochemical reduction, such as $WO_3$. The space between the two EC electrode layers is filled with an electrolyte solution. When an EC device of this type is left in the bleached state for some period of time and then driven for coloration, the density of coloration is insufficient because of a decrease in the quantity of electricity in the oxidizing and coloring reaction of the first EC electrode layer. The invention solves this problem by using, as the electrolyte solution, a solution of a lithium salt and a sodium salt in an organic solvent prepared such that $Na^+$ ion amounts to 3-30 mol % of the total of $Li^+$ ion and $Na^+$ ion.

8 Claims, 1 Drawing Sheet

DURATION OF LEAVING EC DEVICE AS BLEACHED (day)

ELECTROCHROMIC DEVICE WITH AN ELECTROLYTE COMPRISING A LITHIUM SALT AND A SODIUM SALT

BACKGROUND OF THE INVENTION

This invention relates to an electrochromic device which utilizes a combination of two types of electrochromic materials one of which takes on color in its electrochemically oxidized state while the other takes on color in its electrochemically reduced state, and more particularly the invention is an improvement in the electrolyte solution in the electrochromic device.

Conventional electrochromic (EC) materials are classified into two types, which will be referred to as "oxidation type" and "reduction type", respectively, in the present specification. An EC material of oxydation type takes on color in its electrochemically oxidized state, whereas an EC material of reduction type takes on color in its electrochemically reduced state.

It is known to use a combination of an oxidation type EC material and a reduction type EC material in an EC device having two oppositely arranged electrodes. The two types of EC materials are assigned to the two electrodes, respectively. For example, JP-A 59-159134 shows an EC display device using a combination of Prussian blue which assumes blue color in its electrochemically oxidized state and becomes colorless by reduction and tungsten trioxide which is colorless in its electrochemically oxidized state and assumes blue color in a reduced state. In the EC device the space between the two opposite EC electrode layers is filled with an electrolyte liquid, which is usually a solution of lithium perchlorate in propylene carbonate. U.S. Pat. No. 4,773,741 shows an EC display device of fundamentally the same type. In operation of the EC display device, electrochemical oxidation of the EC material on one electrode is accompanied by electrochemical reduction of the EC material on the other electrode. Accordingly simultaneous coloration of the two electrodes and simultaneous bleaching of the two electrodes take place. The primary purpose of this construction is intensifying blue coloration of the EC device.

In practical use of an EC device of the above type it is not seldom that the EC device is left in the bleached state (i.e. the Prussian blue electrode in the reduced state) for several days or still longer. When the EC device left in such a state is driven for coloration, the density of coloration is lower than that in the coloration operation before the last bleaching and in some cases insufficient for practical purposes. The density of coloration can be resumed to some extent by repeating coloration and bleahing many times, but for fully resuming the density of coloration it is necessary to leave the EC device in the colored state for several days. This is detrimental to the commercial value of the EC device.

SUMMARY OF THE INVENTION

It is an object of the present invention to provide an EC device of the above described type, which does not suffer from significant lowering of the density of coloration even if the device is left in the bleached state.

The present invention provides an electrochromic device comprising a transparent first substrate laid with a transparent electrode film, a second substrate which is laid with an electrode film and arranged opposite to and spaced from the first substrate such that the electrode films of the respective substrates are opposite to each other, a first electrochromic layer which is laid on the electrode film of one of the first and second substrates and formed of an electrochromic material which takes on a characteristic color in its electrochemically oxidized state and is selected from Prussian blue, osmium purple and ruthenium purple, a second electrochromic layer which is laid on the electrode film of the other of the first and second substrates and formed of a transition metal oxide which takes on a characteristic color in its electrochemically reduced state, seal means for holding the first and second substrates in the opposite and spaced arrangement and defining a space between the first and second substrates, and an electrolyte solution which fills the aforementioned space and is a solution of a lithium salt and a sodium salt in an organic solvent, the proportion of the sodium salt to the lithium salt being such that in the solution sodium ion amounts to 3-30 mol % of the total of lithium ion and sodium ion.

The invention resides in the above stated combination of cations in the electrolyte solution. We have reached a conclusion that the lowering of the density of coloration resulting from leaving the EC device in the bleached state is attributed to a decrease in the quantity of electricity in the electrochemically oxidizing reaction of Prussian blue, or an alternative EC material of oxidation type, in the EC device. The electrochemical oxidation and reduction reaction of Prussian blue can be represented by the following formula, though the mechanism of the reaction has not fully been elucidated.

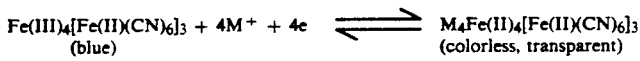

$$Fe(III)_4[Fe(II)(CN)_6]_3 + 4M^+ + 4e \rightleftharpoons M_4Fe(II)_4[Fe(II)(CN)_6]_3$$
(blue) (colorless, transparent)

In conventional EC devices using Prussian blue the cation $M^+$ is $Li^+$ ion, though sometimes $Na^+$ ion is alternatively employed in laboratories. We have studied the cation selectivity of the electrochemical oxidation reaction of Prussian blue by a quartz vibrator microbalance method in solution and found that in an organic polar solvent such as propylene carbonate the affinity of Prussian blue for $Na^+$ ion is about 15 times as high as that for $Li^+$ ion. However, when simply $Na^+$ ion is used instead of $Li^+$ ion the rate of the electrochemical reaction of $WO_3$, or an alternative transition metal oxide, on the opposite electrode lowers considerably so that the EC device becomes low in responsiveness.

In the electrolyte solution according to the invention $Na^+$ ion is used together with $Li^+$ ion such that the amount of $Na^+$ ion ranges from 3 to 30 mol % of the total cations, $Na^+$ and $Li^+$ ions. By using this electrolyte solution the degree of decrease in the quantity of electricity in the oxidation reaction of Prussian blue, or osmium purple or ruthenium purple, resulting from leaving the EC device as bleached is remarkably reduced, and therefore at the next coloring operation of the EC device the density of coloration is sufficient even if the device was left as bleached for several days. For example, in an EC device according to the invention using Prussian blue and $WO_3$ the quantity of electricity in the reaction of Prussian blue is initially about 15 $mC/cm^2$, and when this EC device is left as bleached for 2 or 3 days and then driven for oxidation the quantity of electricity is still as large as about 12 mC/cm$^2$, i.e. more than 80% of the initial value. If the amount of Na$^+$ ion in the electrolyte solution is decreased to 1 or 2 mol % of the total of Li$^+$ ion and Na$^+$ ion the quantity of electricity becomes about 70% of the initial value or still lower by leaving the EC device as bleached for only 1 day.

The present invention can be embodied in both EC display devices and EC boards or panels for controlling transmittance of light therethrough.

DESCRIPTION OF THE PREFERRED EMBODIMENTS

Figure 1:
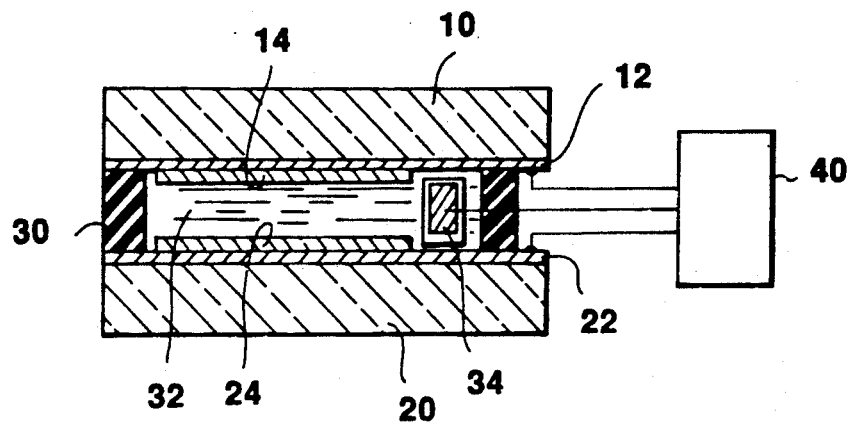
FIG. 1 is an explanatory sectional view of an EC display device embodying the present invention.

FIG. 1 shows a general construction of an EC display device which embodies the present invention. The EC display device has oppositely arranged front and back substrates 10 and 20 both of which are transparent. A transparent electrode film 12 is deposited on the inside surface of the front substrate 10, and a first EC layer 14 is formed on the electrode film 12. Another transparent electrode film 22 is deposited on the inside surface of the back substrate 20, and, opposite to the first EC layer 14, a second EC layer 24 is formed on this electrode film 22. The transparent electrode films 12, 22 are usually formed of SnO$_2$ and/or In$_2$O$_3$ by using a PVD method such as sputtering or vacuum evaporation. The first EC layer 14 is formed of an EC material of oxidation type selected from Prussian blue, osmium purple Fe(III)$_4$-[Os(II)(CN)$_6$]$_3$ and ruthenium purple Fe(III)$_4$-[Ru(II)(CN)$_6$]$_3$, whereas the second EC layer 24 is formed of a transition metal oxide which serves as an EC material of reduction type, such as WO$_3$, MoO$_3$, V$_2$O$_5$, Nb$_2$O$_5$ or TiO$_2$, or a mixture of a transistion metal oxide and a metal as represented by a mixture of WO$_3$ and Au.

The two substrates 10 and 20 are spaced from and parallel to each other by a layer 30 of a sealing material, which is applied peripherally of the substrates 10, 20 so as to surround the EC layers 14, 24. According to the need, tiny spacers (not shown) such as glass spheres may be used to accurately determine the distance between the two substrates 10 and 20. The space defined between the two substrates 10, 20 is filled with an electrolyte solution 32.

An auxiliary electrode 34 is disposed in a marginal region of the space between the two substrates 10, 20. The auxiliary electrode 34 is insulated from the transparent electrode films 12 and 22 but is ionically conductive with the electrolyte solution 32. The primary purpose of the auxiliary electrode 34 is for initial reduction of the first EC layer 14 of oxidation type. When the first and second EC layers 14, 24 are formed respectively by usual methods it is inevitable that both of the two EC layers 14, 24 are in electrochemically oxidized state, so that the first EC layer 14 (of oxidation type) assumes its characteristic color whereas the second EC layer 24 (of reduction type) remains colorless. Therefore, it is necessary to accomplish electrochemical reduction of the first EC layer 14 precedent to actual operation of the EC device. The auxiliary electrode 34 is used for this reduction treatment. Furthermore, the auxiliary electrode 34 can be used for remedying unbalance of electric charges between the first and second EC layers 14 and 24. Usually the body of the auxiliary electrode 34 is formed of an electroconductive material and a substance which is electrochemically and reversibly oxidizable and reducible. Numeral 40 indicates a controller for applying a controlled voltage between the two transparent electrodes 12 and 22 or between the auxiliary electrode 34 and either of the two electrode films 12 and 22.

The electrolyte solution 32 is a solution of a lithium salt and a sodium salt in an organic polar solvent such as propylene carbonate, which is preferred, or acetonitrile. It is optional to add a small amount of water (up to about 5 wt %) to the organic solvent. As the lithium and sodium salts it is preferred to use lithium perchlorate and sodium perchlorate, though it is also possible to use a different salt such as chloride. The electrolyte solution 32 is prepared such that the cations in the solution consist of 3–30 mol % of Na$^+$ ion and the balance of Li$^+$ ion. If the amount of Na$^+$ ion is less than 3 mol % the effect of the addition of Na$^+$ ion is insufficient so that the coloring operation of the EC device after leaving the device in the bleached state suffers from insufficient density of coloration. When the amount of Na$^+$ ion exceeds 30 mol % it takes a considerably long time to accomplish bleaching of the EC device, in particular bleaching of the transition metal oxide layer 24, and in an extreme case complete bleaching cannot be accomplished. It is preferred that Na$^+$ ion occupies at least 5 mol % of the total of Na$^+$ and Li$^+$ ions, and in most cases an optimum amount of Na$^+$ ion is in the range from 5 to 25 mol %.

EXAMPLE

An EC display device of the construction shown in FIG. 1 was produced by using the following materials.

The transparent substrates 10 and 20 were glass plates 100 mm × 100 mm in widths and 1.2 mm in thickness. Each of the transparent electrode films 12 and 22 was an ITO film having surface resistivity of about 20 Ω/□. As the first EC layer 14, a Prussian blue film having a thickness of about 4000 Å was formed by an electrodeposition method. As the second EC layer 24, a WO$_3$ film having a thickness of about 4000 Å was formed by a vacuum evaporation method. Both the first and second EC layers 14, 24 had an effective surface area of 60 cm$^2$. The body of the auxiliary electrode 34 was formed of a mixture of carbon, poly(4,4',4"-triphenylamine) and a fluororesin (binder). The electrolyte solution 32 was a solution prepared by dissolving 0.8 mol of LiClO$_4$ and 0.2 mol of NaClO$_4$ per liter of propylene carbonate containing 1.2 wt % of water.

In this EC device, initially the Prussial blue layer 14 assumed blue color whereas the WO$_3$ layer 24 was colorless. By an electrochemical reduction treatment using the auxiliary electrode 34 the Prussian blue layer 14 was bleached to a colorless and transparent state, while leaving the WO$_3$ layer 24 in the colorless state. After that, simultaneous coloration of the Prussian blue layer 14 and the WO$_3$ layer 24 could be accomplished by applying a DC voltage between the two opposite electrodes 12 and 22 so as to keep the Prussian blue layer 14 at a potential of 1.0 V versus the $WO_3$ layer 24, and simultaneous and complete bleaching of the two EC layers 14, 24 by changing the potential of the Prussian blue layer 14 versus the $WO_3$ layer 24 to 0.5 V.

Figure 2:
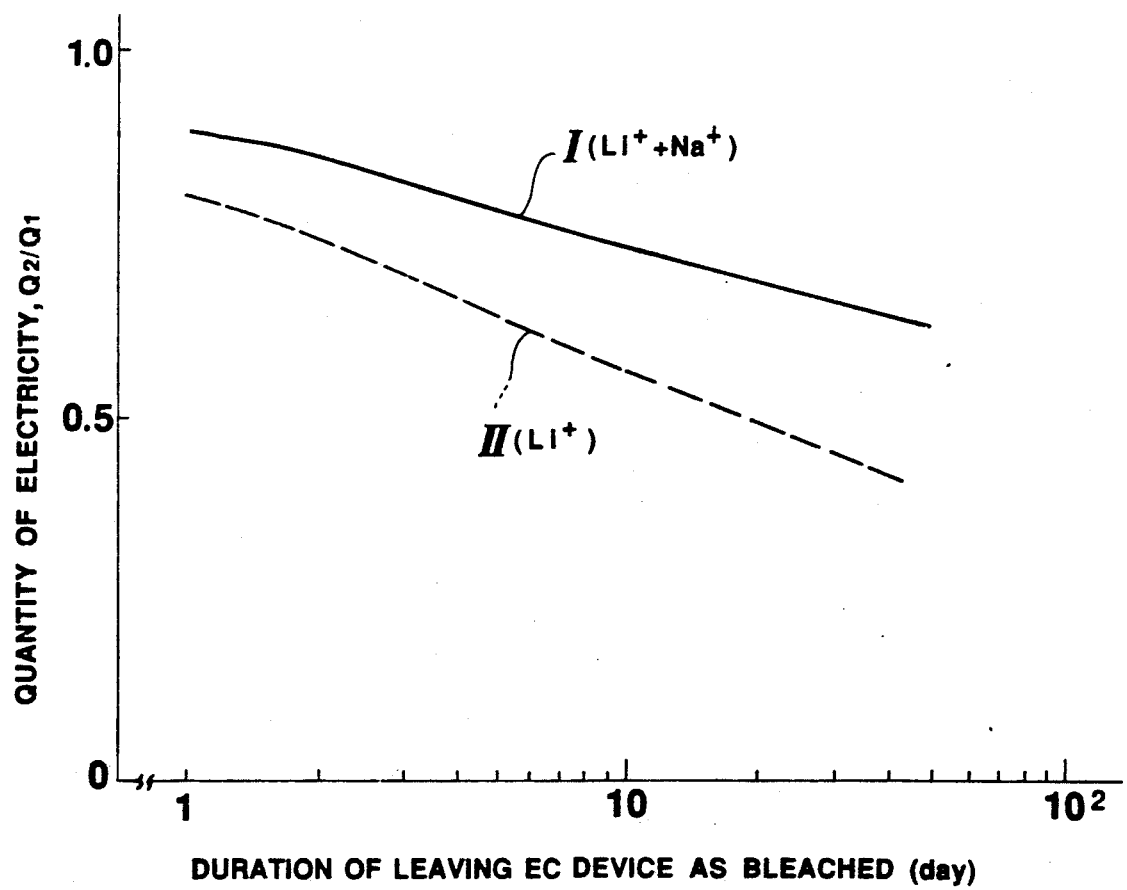
FIG. 2 is a graph showing the rate of a decrease in the quantity of electricity in an electrochemical coloring reaction in an EC device of the type shown in FIG. 1 resulting from leaving the EC device in the bleached state for some period of time, with respect to samples according to the invention and samples not in accordance with the invention.

Several samples of this EC display device were left in the bleached state for variously predetermined periods of time ranging from 1 day to more than 30 days. After that each sample was driven for coloration to measure the quantity of electricity in the first coloring reaction of the Prussian blue layer 24, $Q_2$, after being left in the bleached state, and $Q_2$ was compared with the quantity of electricity in the same reaction measured before leaving the sample in the bleached state, $Q_1$. The results are shown in FIG. 2 by the curve I in solid line.

COMPARATIVE EXAMPLE

The EC display device of the above example was modified only in the composition of the electrolyte solution 32. In this case the solution 32 was prepared by dissolving 1.0 mol of $LiClO_4$ along per liter of propylene carbonate containing 1.2 wt % of water.

Samples of the EC display device of Comparative Example were subjected to the above described test to measure the rate of a change in the quantity of electricity in the coloring reaction resulting from being left in the bleached state. The results are shown in FIG. 2 by the curve II in broken line.

Supplementarily, the electrolyte solution of Comparative Example was modified by replacing 2 mol % of $LiClO_4$ by $NaClO_4$ and the above described test was repeated. The results were not significantly different from the curve II in FIG. 2.

From a comparison between the curves I and II in FIG. 2, the use of the electrode solution containing a suitable amount of $Na^+$ ion produced remarkable improvement in the coloration efficiency of the EC device: by about 10% in the case of leaving the EC device in the bleached state for one day, by about 30% for one week and by about 50% for one month.

What is claimed is:

1. An electrochromic device comprising:
   a transparent first substrate laid with a transparent electrode film;
   a second substrate which is laid with an electrode film and arranged opposite to and spaced from the first substrate such that the electrode films of the respective substrates are opposite to each other;
   a first electrochromic layer which is laid on the electrode film of one of the first and second substrates and formed of an electrochromic material which takes on a characteristic color in its electrochemically oxidized state and is selected from the group consisting of Prussian blue, osmium purple and ruthenium purple;
   a second electrochromic layer which is laid on the electrode film of the other of the first and second substrates and formed of a transition metal oxide which takes on a characteristic color in its electrochemically reduced state;
   seal means for holding the first and second substrates in the opposite and spaced arrangement and defining a space between the first and second substrates; and
   an electrolyte solution which fills said space and is a solution of lithium perchlorate and sodium perchlorate in an organic solvent, the proportion of sodium perchlorate to lithium perchlorate being such that in the solution sodium ion amounts to 3-30 mol % of the total of lithium ion and sodium ion.

2. A device according to claim 1, wherein in said solution sodium ion amounts to at least 5 mol % of the total of lithium ion and sodium ion.

3. A device according to claim 2, wherein in said solution the amount of sodium ion is not more than 25 mol % of the total of lithium ion and sodium ion.

4. A device according to claim 1, wherein said transition metal oxide is selected from the group consisting of $WO_3$, $MoO_3$, $V_2O_5$, $Nb_2O_5$ and $TiO_2$.

5. A device according to claim 1, wherein said first electrochromic layer is formed of Prussian blue, and said transition metal oxide is $WO_3$.

6. A device according to claim 1, wherein said organic solvent is propylene carbonate.

7. A device according to claim 1, wherein the second substrate and said electrode film on the second substrate are transparent.

8. A device according to claim 1, wherein said solution contains water in an amount not more than 5 wt % of said organic solvent.

* * * * *